United States Patent
Tiwari et al.

(10) Patent No.: US 11,768,759 B2
(45) Date of Patent: Sep. 26, 2023

(54) METHOD AND SYSTEM FOR AUTOMATED TESTING OF WEB SERVICE APIS

(71) Applicant: Tata Consultancy Services Limited, Mumbai (IN)

(72) Inventors: Ashish Mani Tiwari, Bangalore (IN); Brijendra Sharma, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 122 days.

(21) Appl. No.: 17/482,841

(22) Filed: Sep. 23, 2021

(65) Prior Publication Data
US 2022/0100644 A1    Mar. 31, 2022

(30) Foreign Application Priority Data
Sep. 29, 2020    (IN) .............................. 202021042302

(51) Int. Cl.
*G06F 11/36* (2006.01)
*H04L 67/02* (2022.01)

(52) U.S. Cl.
CPC ...... *G06F 11/3684* (2013.01); *G06F 11/3688* (2013.01); *G06F 11/3692* (2013.01); *H04L 67/02* (2013.01)

(58) Field of Classification Search
CPC ............. G06F 11/3684; G06F 11/3688; G06F 11/3692; H04L 67/02
See application file for complete search history.

(56) References Cited

U.S. PATENT DOCUMENTS

| | | | |
|---|---|---|---|
| 9,419,884 B1 | 8/2016 | Li et al. | |
| 10,223,239 B1* | 3/2019 | Ghanbaran | G06F 11/3672 |
| 10,361,944 B2 | 7/2019 | Chavda et al. | |
| 2007/0168971 A1 | 7/2007 | Royzen et al. | |
| 2008/0270974 A1 | 10/2008 | Topchiyski et al. | |
| 2018/0357154 A1* | 12/2018 | Dolby | G06F 11/3664 |

* cited by examiner

*Primary Examiner* — Wei Y Zhen
*Assistant Examiner* — Amir Soltanzadeh
(74) *Attorney, Agent, or Firm* — Finnegan, Henderson, Farabow, Garrett & Dunner, LLP

(57) ABSTRACT

Existing methods of automated testing of web service APIs require additional tools to extract API related details and configuration files to create test cases. The method and system disclosed herein taps annotations present in code of web service APIs to extract API related details and creates test cases using the extracted data. The method disclosed herein describes an approach to identify resource classes related to a plurality of web service APIs using built-in annotations in code of web application under test. Further, the identified resource classes are scanned to extract API related details (metadata) using built-in annotations and annotations given by a developer. Further, the extracted metadata is forwarded to a test engine server which generates a plurality of test cases using the extracted metadata. Further, the plurality of web service APIs are tested using the generated test cases.

7 Claims, 3 Drawing Sheets

METHOD AND SYSTEM FOR AUTOMATED TESTING OF WEB SERVICE APIS

PRIORITY CLAIM

This U.S. patent application claims priority under 35 U.S.C. § 119 to the Indian patent application no. 202021042302, filed on Sep. 29, 2020. The entire contents of the aforementioned application are incorporated herein by reference.

TECHNICAL FIELD

The disclosure herein generally relates to the field of software testing, and, more particularly, to a method and system for automated testing of web service Application Programming Interfaces (APIs).

BACKGROUND

Modern day web applications are built using variety of programming languages such as Java, .Net, Angular JS, Node.js etc. Most often, these heterogeneous applications need some sort of communication to happen between them. Since they are built using different programming languages, it becomes really difficult to ensure accurate communication between applications. Web services provide a common platform that allow multiple applications built on various programming languages to have the ability to communicate with each other. Web services can be implemented in different ways and two of the most popular approaches are using Simple Object Access Protocol (SOAP) and Representational State Transfer architecture (REST), However, most enterprises nowadays are shifting to REST services, which usually employ JavaScript Object Notation (JSON) as data format for the message payloads.

Web services are tested before deployment of a web application to verify that all of the Application Programming Interfaces (APIs) exposed by the web application operate as expected. A test case used for testing a REST web service is in the form of an HTTP (Hypertext Transfer Protocol) request and test data is a string, representing the HTTP request. The HTTP request comprises headers, a URL, an HTTP method and a body etc. The content in the body could be in any format such as Extensible Markup Language (XML), JavaScript Object Notation (JSON) etc.

A conventional method of testing a web service is to manually create test cases. A number of methods for automatic generation of test cases are developed. However, these methods are rule based and require rules to be specified in separate configuration files made available to a testing tool, which generates test cases using the data in the configuration files. Creation of configuration files is a manual process and the configuration files need to be changed whenever there is a change in the web application. Also, some of the state of the art methods of automated testing of web service APIs require a separate tool or dedicated end points for extracting API related details useful for test case generation which is a time consuming process. Hence, existing approaches for automated testing of web service APIs are time consuming and require regular updates in order to incorporate changes in functionality of web service APIs, effectively do not offer a real automated test case generation.

SUMMARY

Embodiments of the present disclosure present technological improvements as solutions to one or more of the above-mentioned technical problems recognized by the inventors in conventional systems.

For example, in one embodiment, a method for automated testing of web service APIs is provided.

The method comprises receiving a web application comprising a plurality of web APIs; identifying a plurality of resource classes corresponding to each of the plurality of web service APIs by an instance of a forwarder using API related annotations present in a code of a package specified in the instance of the forwarder. The forwarder is a library integrated with the web application. Further, the method comprises extracting metadata related to each of the plurality of web service APIs from the plurality of resource classes by the instance of the forwarder using reflection libraries. The extracted metadata for each of the plurality of web service APIs comprises at least one of (i) a Uniform Resource Identifier (URI); (ii) an HTTP Method, (iii) path variables (iv) headers, (v) request parameters, (vi) a request body structure and (vii) a response body structure identified from built-in annotations in a code of the corresponding resource class, (viii) sequence of call (ix) method of authentication and (x) special field constraints identified from ApiInfo annotation and AttributeInfo annotation provided by a developer in a code of corresponding resource class. Furthermore, the method comprises forwarding the extracted metadata to a test engine server to generate the plurality of test cases for the plurality of web service APIs in the resource classes; wherein each of the plurality of test cases are generated by the test engine server as an HTTP request comprising (i) the path variables; (ii) the request parameters, (iii) the request body, (iv) a Uniform Resource Locator (URL) derived from the URI, (v) the authentication method (vi) the headers and (vii) the HTTP method based on the extracted metadata.

In another aspect, a system for automated testing of web service APIs is provided. The system comprises a memory storing instructions; one or more Input/Output (I/O) interfaces; and one or more hardware processors coupled to the memory via the one or more I/O interfaces; wherein the one or more hardware processors are configured by the instructions to receive a web application comprising a plurality of web APIs; identify a plurality of resource classes corresponding to each of the plurality of web service APIs by an instance of a forwarder using API related annotations present in a code of a package specified in the instance of the forwarder. The forwarder is a library integrated with the web application. Further, the one or more hardware processors are configured to extract metadata related to each of the plurality of web service APIs from the plurality of resource classes by the instance of the forwarder using reflection libraries. The extracted metadata for each of the plurality of web service APIs comprises at least one of (i) a Uniform Resource Identifier (URI), (ii) an HTTP method, (iii) path variables, (iv) headers, (v) request parameters, (vi) a request body structure and (vii) a response body structure identified from built-in annotations in a code of the corresponding resource class, (viii) sequence of call, (ix) method of authentication and (x) special field constraints identified from ApiInfo annotation and AttributeInfo annotation provided by a developer in a code of corresponding resource class. Furthermore, the one or more hardware processors are configured to forward the extracted metadata to a test engine server to generate the plurality of test cases for the plurality of web service APIs in the resource classes, wherein each of the plurality of test cases are generated by the test engine server as an HTTP request comprising (i) the path variables, (ii) the request parameters, (iii) the request body, (iv) a Uniform Resource Locator (URL) derived from the URI, (v) the authentication method (vi) the headers and (vii) the HTTP method based on the extracted metadata.

In yet another aspect, there are provided one or more non-transitory machine readable information storage mediums comprising one or more instructions, which when executed by one or more hardware processors causes a method for testing of web service APIs. The method comprises receiving a web application comprising a plurality of web APIs; identifying a plurality of resource classes corresponding to each of the plurality of web service APIs by an instance of a forwarder using API related annotations present in a code of a package specified in the instance of the forwarder. The forwarder is a library integrated with the web application. Further, the one or more hardware processors are configured to extract metadata related to each of the plurality of web service APIs from the plurality of resource classes by the instance of the forwarder using reflection libraries. The extracted metadata for each of the plurality of web service APIs comprises at least one of (i) a Uniform Resource Identifier (URI), (ii) an HTTP method, (iii) path variables, (iv) headers, (v) request parameters, (vi) a request body structure and (vii) a response body structure identified from built-in annotations in a code of the corresponding resource class, (viii) sequence of call, (ix) method of authentication and (x) special field constraints identified from ApiInfo annotation and AttributeInfo annotation provided by a developer in a code of corresponding resource class. Furthermore, the one or more hardware processors are configured to forward the extracted metadata to a test engine server to generate the plurality of test cases for the plurality of web service APIs in the resource classes, wherein each of the plurality of test cases are generated by the test engine server as an HTTP request comprising (i) the path variables, (ii) the request parameters, (iii) the request body, (iv) a Uniform Resource Locator (URL) derived from URI, (v) the authentication method (vi) the headers and (vii) the HTTP method based on the extracted metadata.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for automated testing of web service APIs. Unlike existing methods, that require separate tools to extract API related details and require rules to be specified in configuration files for test case generation, the method and system disclosed herein automatically extract API related details from annotations present in code of a resource class of the web service API. The system utilizes the extracted API related details or metadata to create test cases for the web service API. Unlike existing methods, the method and system disclosed herein do not require configuration files to generate test cases. Such configuration file based approaches require manual intervention for configuration file generation and the configuration files need to be changed for every change in the web application. The method disclosed herein provides a web application agnostic solution for test generation, eliminates manual intervention and offers a true automated test case generation for testing web service APIs.

Figure 1:
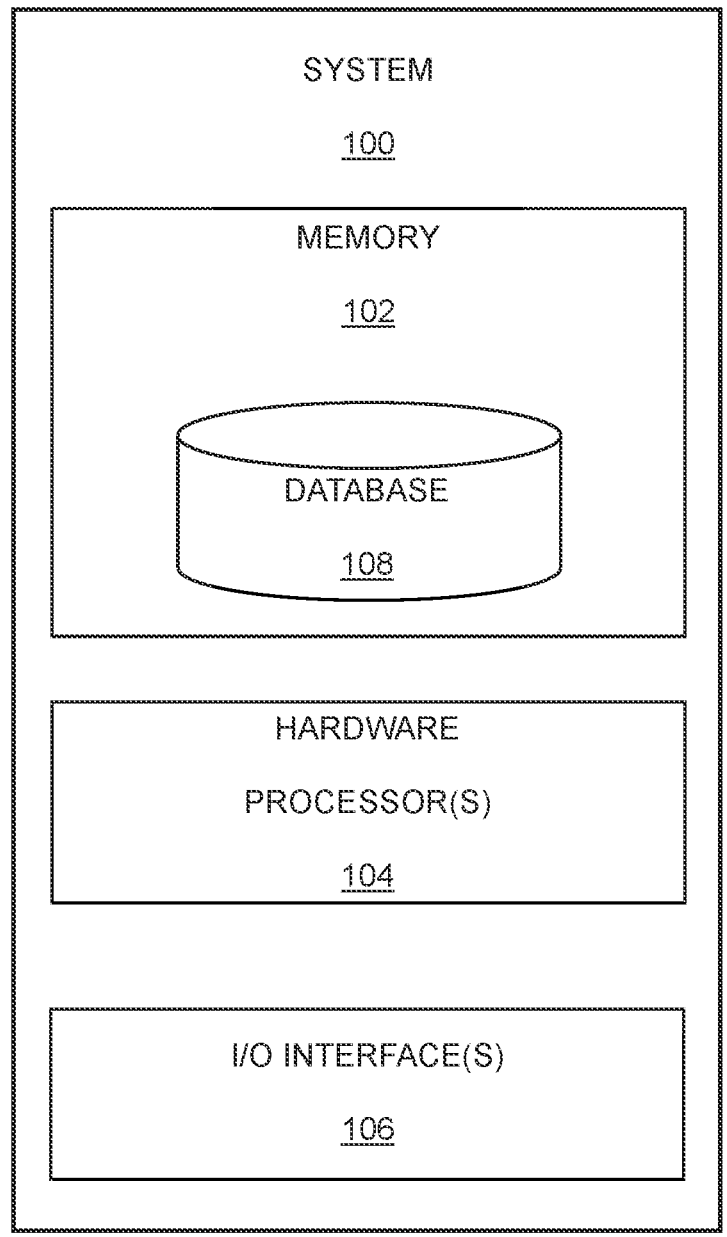
FIG. 1 is a functional block diagram of a system for automated testing of web service Application Programming Interfaces (APIs), in accordance with some embodiments of the present disclosure.
Figure 2:
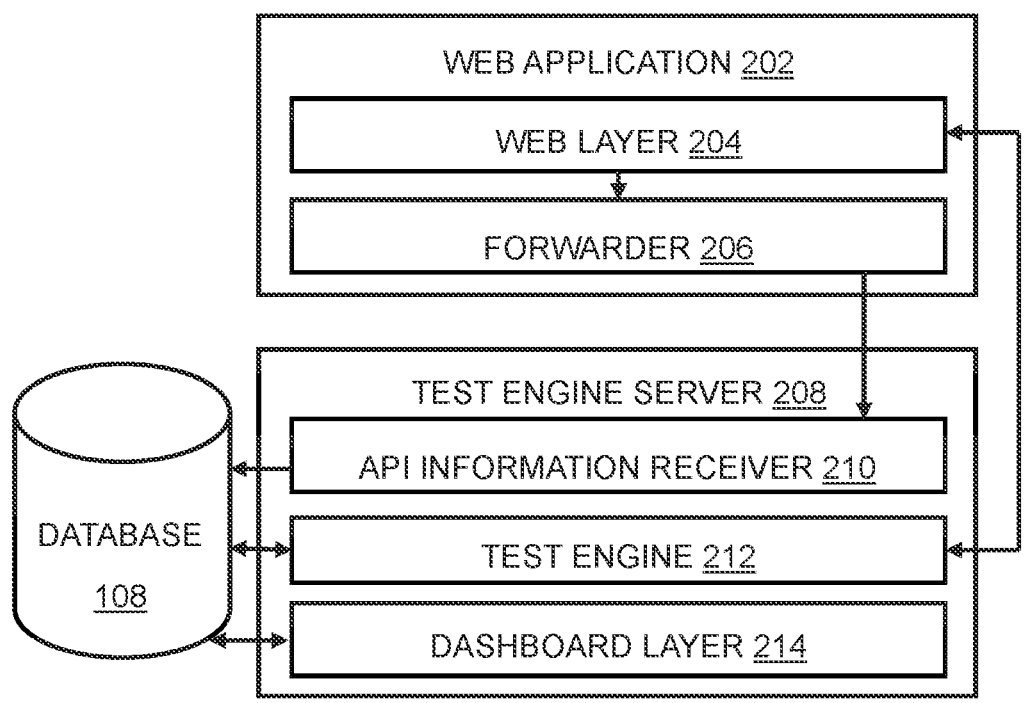
FIG. 2 is a high level architecture of the system of FIG. 1 depicting components of the system for automated testing of web service APIs, in accordance with some embodiments of the present disclosure.
Figure 3:
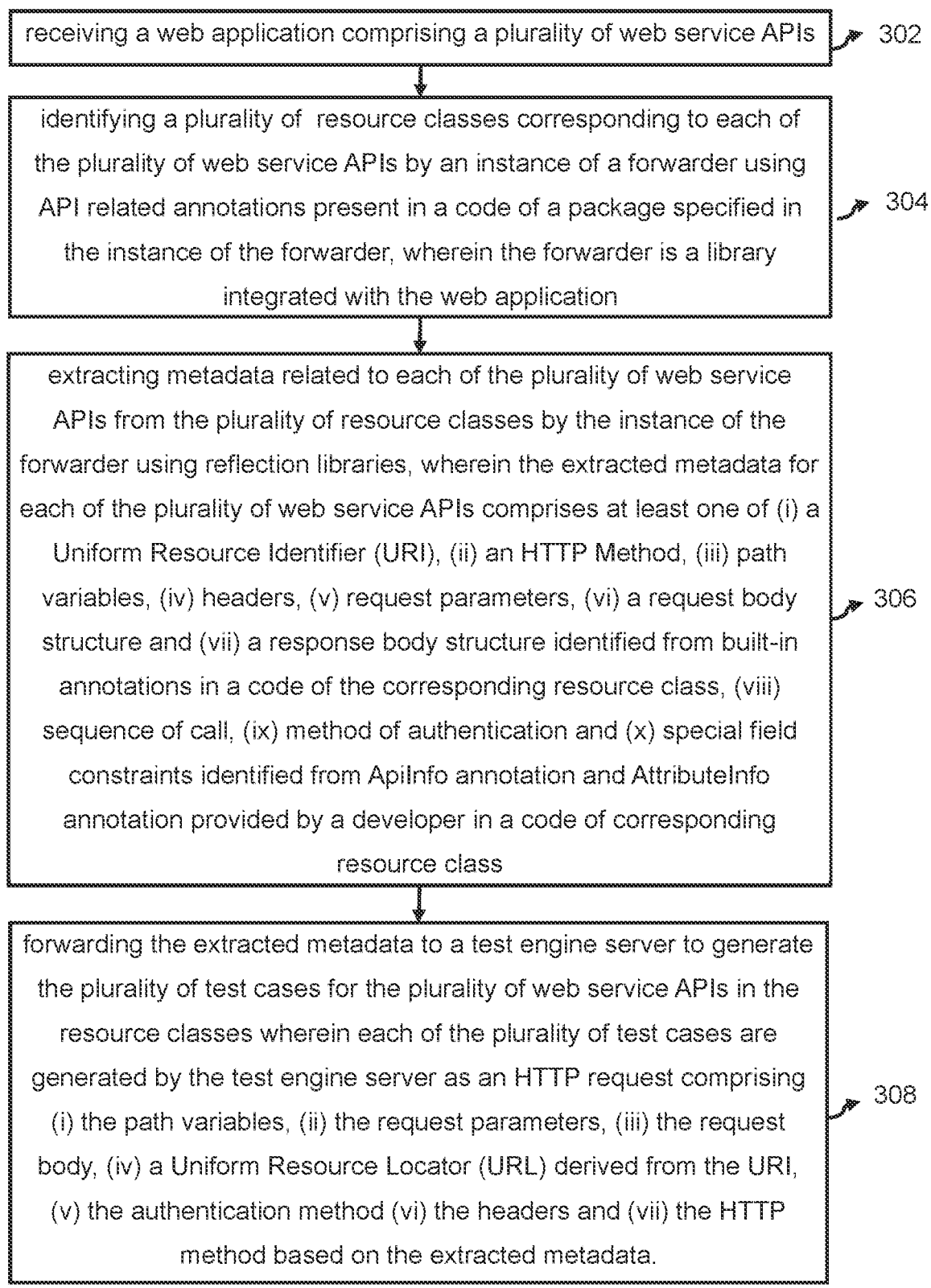
FIG. 3 illustrates a flow diagram illustrating a method for automated testing of web service APIs, implemented by the system of FIG. 1, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram of a system 100 for automated testing of web service APIs, in accordance with some embodiments of the present disclosure.

In an embodiment, the system 100 includes a processors) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. The I/O interface 106 displays information related to a web application under test. A user may be able to start or stop the test through the I/O interface 106. After testing is complete, the user can view details such as number of test cases passed, number of test cases failed and for each test case, the user will be able to view details such as time of call, response code, response duration (in ms), URL, HTTP method, request body and response body.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure.

Further, the memory 102 may include a database 108, which may store data including but not limited to a web application under test among a plurality of web applications, data related to the web applications according to business requirements, metadata extracted from web service APIs of the web application, test data, request and response from server and user input from I/O interface 106 such as start flag or stop flag, test data limit, load etc. The memory 102 also includes components depicted in FIG. 2. In an embodiment, the database 108 may be external (not shown) to the system 100 and coupled to the system via the I/O interface 106. Functions of the components of system 100 are explained in conjunction with high level architecture of FIG. 2 and flow diagram of FIG. 3 for automated testing of web service APIs.

FIG. 2 is a high level architecture of the system of FIG. 1 depicting components of the system for automated testing of web service APIs, in accordance with some embodiments of the present disclosure.

In an embodiment, the system 100 comprises one or more data storage devices or the memory 102 operatively coupled to the processor(s) 104 and is configured to store the software components depicted in FIG. 2 and executed by one or more hardware processors 104. The high level architecture for automated testing of web service APIs comprises plurality of functional components such as a web application 202 and a test engine server 208. The web application 202 includes a web layer 204 and a forwarder 206. The web layer 204 comprises source code of the web application 202 comprising a plurality of resource classes corresponding to a plurality of web services. In a specific implementation of the web application 202 in Spring framework, resource classes may alternatively be referred as controller classes. The forwarder 206 is a library integrated with the web application 202, For example, if the web application 202 is developed using Java programming language, the forwarder 206 may be a JAR (Java Archive) file and is added in build path of the web application 202. Once the forwarder 206 is integrated with the web application 202, an instance of the forwarder 206 is created within the web application 202. An example for the creation of instance of the forwarder 206 and forwarding metadata to the test engine server 208 is given below:

Example 1

```
// Statement to create forwarder instance and call forward method
new ApiDataForwarder.Builder( )
```

-continued

```
.basePackage("testenginedemo.testproject")
.environment("TEST")
.testEngineHost("localhost")
.testEnginePort("2443")
.url("http://localhost:8080")
.build( )
.forward( );
```

Details of instance variables used in the above example are given below:

basePackage: Specifies a package name which needs to be scanned to identify one or more resource classes comprising the plurality of web service APIs. One or more package names may be specified.

environment: It should be "TEST" to enable testing. This feature prevents accidental testing on production environment.

testEngineHost: It indicates hostname of the test engine server 208.

testEnginePort: It indicates port on which the test engine server 208 is running.

url: It indicates address of the web application 202. This is the URL (Uniform Resource Locator) which test engine server 208 will use to make test calls.

forward: This method forwards the metadata to the test engine server.

It uses testEngineHost and testEnginePort to locate the test engine server. The test engine server 208 needs to be running before the web application 202 is started.

The test engine server 208 comprises an API information receiver 210, a test engine 212 and a dashboard layer 214. The test engine server 208 is also connected to the database 108. The API information receiver 210 is configured to receive the data sent by the forwarder 206. Further, the API information receiver 210 persists the received data in the database 108. The test engine 212 is configured to create test cases using data related to the web service APIs and perform testing of the web service APIs. The dashboard layer 214 is a user interface which displays test results to a user via the I/O interface 106.

FIG. 3 illustrates a flow diagram illustrating a method 300 for automated testing of web service APIs, implemented by the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1, the high level architecture of FIG. 2 and the steps of flow diagram as depicted in FIG. 3. Although process steps, method steps, techniques or the Ike may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method 300 disclosed herein provides the method of automated testing of web service APIs.

Referring to the steps of the method 300, at step 302, one or more hardware processors 104 are configured to receive the web application 202 comprising a plurality of web service APIs to be tested.

At step 304 of the method 300, the one or more hardware processors 104 are configured to identify a plurality of resource classes corresponding to each of the plurality of web service APIs by an instance of the forwarder 206 using API related annotations present in a code of a package specified in the instance of the forwarder.

The instance of the forwarder 206 scans the package to identify API related annotations such as @RestController for web applications developed in Spring framework, @Path for web applications developed in JaxRS etc. The annotations indicate that a class following the annotation is a resource class, Thus, the instance of the forwarder 206 identifies resource classes by identifying API related annotations.

At step 306 of the method 300, the one or more hardware processors 104 are configured to extract metadata related to each of the plurality of web service APIs from the plurality of resource classes by the instance of the forwarder 206 using reflection libraries. The extracted metadata for each of the plurality of web service APIs comprises at least one of (i) a Uniform Resource Identifier (URI), (ii) an HTTP Method, (iii) path variables, (iv) headers, (v) request parameters, (vi) a request body structure and (vii) a response body structure identified from built-in annotations in a code of the corresponding resource class, (viii) sequence of call, (ix) method of authentication and (x) special field constraints identified from ApiInfo annotation and AttributeInfo annotation provided by a developer in a code of corresponding resource class.

The instance of the forwarder 206 scans the identified resource classes looking for a plurality of annotations in the code of the identified resource classes. In an embodiment, an object parser utility of the instance of the forwarder 206 aids in scanning the resource classes and extracting the metadata from plurality of annotations. The plurality of annotations maybe built-in annotations or annotations provided by a developer. Metadata retrieved using built-in annotations comprises (i) a Uniform Resource Identifier (URI), (ii) an HTTP Method, (iii) path variables, (iv) headers, (v) request parameters, (vi) a request body structure and (vii) a response body structure.

The ApiInfo annotation comprises a plurality of attributes as described in Table 1 below:

TABLE 1

| Field | Purpose | Example | Default Value | Data-type |
|---|---|---|---|---|
| sequence | Indicates the order in which APIs should be called | 1. @ApiInfo(sequence = {2, 4}) GET readMessage( ) This API will be called twice in the life cycle 2nd and 4th sequence. 2. @ApiInfo(sequence = 3) UPDATE updateMessage( ) This API will be called in the 3rd sequence | {1} | int[ ] |
| authUsername | Holds data about username for authentication. | @ApiInfo(authUsername = "uname", authPassword="upass") GET readMessage( ) While testing this API, test engine server will use username and password during call. Comparable curl command will be "curl -u uname:upass '<url>'". | "" | String |
| authPassword | Holds data about the password for authentication | same as above. | "" | String |
| authKeys | Holds keys for header based authentication | same as below | { } | String[ ] |
| authValues | Holds values for header based authentication | @ApiInfo(authKeys = {"key1", "key2"}, authValues = {"val1, val2"}) GET readMessage( ) While testing this API, test engine server will use the keys and the values in header during call. Comparable curl command will be "curl -X <method> -H 'key1: val1' -H 'key2: val2' <other headers> -d '-request body>' '<url>'". | { } | String[ ] |
| authTokenExpireAfter | Holds data about token validity time in seconds. It can either take integer value in | same as below | "-1" | String |

TABLE 1-continued

| Field | Purpose | Example | Default Value | Data-type |
|---|---|---|---|---|
| | form of text or else it can take location of expiry time in the form of json path. If "0" is given then test engine server will generate token before every test calls. If it is given "-1" which is default value, then test engine server assumes that token will never expire. | | | |
| authCommand | Holds command to generate token. It can support both web service call as well as command to execute a tool to get tokens. | @ApiInfo(authCommand = "curl -X <method> <headers> <url> -d '<payload>'", authTokenExpireAfter = "auth.expiresAfter", authKeys = {"auth.tokenKey"}, authValues = {"auth.token"}) GET readAPI( ) Before testing this API, test engine server will execute the auth command. The command will return a response in json for example. e.g. {auth: {"token": "12345678ABC", "expiresAfter": 60 0}} Then it makes the test API (readAPI( )) call which is comparable to the curl: "curl -X GET -H 'tokenKey: <value present in json path auth.token which is in this case 12345678ABC >'" <other headers> 'URL' Same headers it will use for next 600 seconds then again it will execute command to get fresh tokens. | "" | String |

The attributeInfo annotations comprises a plurality of attributes as described in table 2 below:

TABLE 2

| Field | Purpose | Example | Default Value | Data-type |
|---|---|---|---|---|
| ignore | Instructs test engine server not to send the annotated field in request | public class Example{ @AttributeInfo(ignore = true) private String notRequireFieldInRequestBody; //getter & setter } Test case will generate json request as: { } | false | boolean |
| realValue | Instructs test engine server to use a real value for the annotated field | Same as below | false | boolean |
| fieldLocation | Provides location of field annotated with realValue attribute | Same as below | "" | String |

TABLE 2-continued

| Field | Purpose | Example | Default Value | Data-type |
|---|---|---|---|---|
| name | Indicates name of the field annotated with realValue attribute | public class Example{<br>@AttributeInfo(realValue = true,<br>fieldLocation = "com.domain.testsampleproject.response.ExampleResponse",<br>name = "id")<br>private String id;<br>//getter & setter<br>}<br>Test engine server looks for previous response where response class details matches with fieldLocation. Then looks for json path for name "id". Say value is found to be "abcd". Then request in test case will be:<br>{"id": "abcd"} | "" | String |
| min | Instructs test engine server to use a value greater than or equal to min for the annotated field | public class Example{<br>@AttributeInfo(min = "1")<br>private int intField;<br>//getter & setter<br>}<br>Test engine server fills field intField with a value greater than or equal to min<br>Sample request body is:<br>{"intField": 4} | "" | String |
| max | Instructs test engine server to use a value less than max for the annotated field | public class Example{<br>@AttributeInfo(max = "4")<br>private int intField;<br>//getter & setter<br>}<br>Test engine server fills field intField with a value less than max<br>Sample request body will be:<br>{"intField": 2} | "" | String |
| minSize | applicable to String fields and collection, map, array fields. Size of annotated field will be greater or equal to minSize | public class Example{<br>@AttributeInfo(minSize = "4")<br>private String name;<br>//getter & setter<br>}<br>Sample request body will be:<br>{"name": "abced"} | "" | String |
| maxSize | applicable to String fields and collection, map, array fields. Size of annotated field will be less than maxSize | public class Example{<br>@AttributeInfo(maxSize = "4")<br>private String name;<br>//getter & setter<br>}<br>Sample request body will be:<br>{"name": "abc"} | "" | String |
| numeric | Indicates test engine server to use only machine generated numeric values. | public class Example{<br>@AttributeInfo(minSize = "4",<br>maxSize = "9", numeric = true)<br>private String numericField;<br>//getter & setter<br>}<br>Sample request body will be:<br>{"numericField": "154678"} | false | boolean |
| prefix | Value of the annotated field will be prepended with the prefix in the request body. | public class Example{<br>@AttributeInfo(minSize = "9",<br>maxSize = "10", prefix = "+919",<br>numeric = true)<br>private String phoneNumber;<br>//getter & setter<br>}<br>Sample request body will be:<br>{"phoneNumber": "+919012345678"} | { } | String[ ] |
| suffix | Value of the annotated field will be appended with | public class Example{<br>@AttributeInfo(minSize = "4",<br>maxSize = "9", suffix = "@domain.com") | { } | String[ ] |

TABLE 2-continued

| Field | Purpose | Example | Default Value | Data-type |
|---|---|---|---|---|
| | suffix in the request body. | private String email;<br>//getter & setter<br>}<br>Sample request body will be:<br>{"email": "wDrABx@domain.com"} | | |

Information related to a plurality of fields in resource class, present in the extracted metadata, are packed into a TestEngineObject model and will be utilized in request body of a test case.

The information retrieved by the instance of the forwarder 206 are packed into an API data model and sent to the test engine server 208 in JSON format. A typical API data model comprises:
- Api name (defined in the instance of the forwarder 206)
- method name (identified by reflection library)
- values/paths (URI) (identified by built-in annotations of Spring JAX-RS etc. framework)
- methods (HTTP method) (identified by built-in annotations of Spring/JAX-RS etc. framework)
- headers (identified by built-in annotations of Spring/JAX-RS etc framework)
- params (identified by built-in annotations of Spring/JAX-RS etc. framework)
- query parameters (data type for this variable is Map where key is name of variable, value's datatype is the TestEngineObject model)
- path variables (data type for this variable is Map where Key is the name of variable, value's datatype is the TestEngineObject model)
- request body (data type for this variable is the TestEngineObject model)
- response body structure (data type for this variable is TestEngineObject model)
- url (defined in the instance of the forwarder 206)
- sequence (Identified by ApiInfo annotation.)
- authDetails (Identified by ApiInfo annotation.)

At step 308 of the method 300, one or more hardware processors 104 are configured to forward the extracted metadata to the test engine server 208 to generate the plurality of test cases for the plurality of web service APIs in the resource classes wherein each of the plurality of test cases are generated by the test engine server as an HTTP request comprising (i) the path variables, (ii) the request parameters, (iii) the request body, (iv) a Uniform Resource Locator (URL) derived from URI, (v) the authentication method (vi) the headers and (vii) the HTTP method based on the extracted metadata.

The forwarder 206 forwards the extracted metadata to the test engine server 208. In the test engine server 208, the API information receiver 210 receives the extracted metadata and stores it in the database 108, When a user initiates testing process, the test engine 212 collects the extracted metadata from the database 108 to generate test cases as a plurality of web service objects which act as request payloads to the web service API. The method of test case generation comprises:
  i. Creating a unique ID for the current testing session.
  ii. Choosing a web service API based on sequence,
  iii. For the chosen API, the test engine 212 gets the corresponding API details, from the database 108, comprising TestEngineObject which contains details of the request fields and fills given fields with values based on the constraints and strategy if it is boundary case or not. For example, consider following field:
    ©AttributeInfo(suffix="@domain.com")
    Private String email;
    The TestEngineObject comprises following data about field "email":
      email field is String type:
      it has suffix "@domain.com
      minSize and maxSize are not applicable here.
    Based on above metadata, the test engine server 208 generates a value (for example R©domain.com).
  iv. Creating a test case as a web service object comprising the API detail and TestEngineObject (created in step iii), the path variables, the request parameters and the request body in URL corresponding to the web service API and optionally the authentication method, the headers and the HTTP method.
  v. Repeating steps (ii) to (iv) for the remaining web service APIs according to the sequence.

Once a test case is generated for a web service API in step (iv), the corresponding web service API is executed using the generated test case and response from the web service is read and stored in the database 108.

The success or failure of test case is determined by inspecting the response code received from the web service API. The response code should indicate a failure for test cases expecting a failure and the response code should indicate success for test cases expecting successful execution.

The written description describes the subject matter herein to enable any person skilled in the art to make and use the embodiments. The scope of the subject matter embodiments is defined by the claims and may include other modifications that occur to those skilled in the art, Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory; nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for automated generation of test cases for web service Application Programming Interfaces (APIs), the method being implemented by one or more hardware processors and comprising:
receiving, by the one or more hardware processors, a web application comprising a plurality of web service APIs;
identifying, by the one or more hardware processors, a plurality of resource classes corresponding to each of the plurality of web service APIs by an instance of a forwarder using API related annotations present in a code of a package specified in the instance of the forwarder, wherein the forwarder is a library integrated with the web application, and wherein the API related annotations indicate that a class following is an annotation is a resource class;
extracting, by the one or more hardware processors, metadata related to each of the plurality of web service APIs from the plurality of resource classes by the instance of the forwarder using reflection libraries, wherein the extracted metadata for each of the plurality of web service APIs comprises at least one of (i) a Uniform Resource Identifier (URI), (ii) an HTTP Method, (iii) path variables, (iv) headers, (v) request parameters, (vi) a request body structure and (vii) a response body structure identified from built-in annotations in a code of the corresponding resource class, (viii) sequence of call, (ix) method of authentication and (x) special field constraints identified from ApiInfo annotation and AttributeInfo annotation provided by a developer in a code of corresponding resource class, wherein the extracting comprises:
scanning, by the one or more hardware processors, the plurality of identified resource classes observed for a plurality of API related annotations in the code of the identified resource classes, and scanning the plurality of identified resource classes by an object parser utility of the instance of the forwarder;
extracting the metadata from the plurality of API related annotations;
forwarding, by the one or more hardware processors, the extracted metadata to a test engine server to store in a database and
collecting, by the test engine server, the extracted metadata from the database and generate a plurality of test cases as a plurality of web service objects, the plurality of web service objects acting as request payloads to the plurality of web service APIs in the resource classes, wherein each of the plurality of test cases are generated by the test engine server as an HTTP request comprising the path variables, the request parameters, the request body, a Uniform Resource Locator, URL, derived from the URI, the authentication method, the headers and the HTTP method based on the extracted metadata, wherein the test cases are generated for the web service APIs according to the sequence of call, and the request fields are filled based on the special field constraints.

2. The method of claim 1, wherein the ApiInfo annotation and the AttributeInfo annotation are additional annotations made available for a developer to refine the test cases.

3. The method of claim 2, wherein the ApiInfo annotation comprises sequence attribute which indicates sequence of call of the web service APIs, a plurality of authentication related attributes and wherein the AttributeInfo annotation comprises a plurality of attributes which facilitate creation of the test cases.

4. A system for automated generation of test cases for web service Application Programming Interfaces (APIs), the system comprising:
a memory storing instructions;
one or more Input/Output (I/O) interfaces; and one or more hardware processors coupled to the memory via the one or more I/O interfaces, wherein the one or more hardware processors are configured by the instructions to:

receive a web application comprising a plurality of web service APIs;

identify a plurality of resource classes corresponding to each of the plurality of web service APIs by an instance of a forwarder using API related annotations present in a code of a package specified in the instance of the forwarder, wherein the forwarder is a library integrated with the web application, and wherein the API related annotations indicate that a class following an annotation is a resource class;

extract metadata related to each of the plurality of web service APIs from the plurality of resource classes by the instance of the forwarder using reflection libraries, wherein the extracted metadata for each of the plurality of web service APIs comprises at least one of (i) a Uniform Resource Identifier (URI), (ii) an HTTP Method, (iii) path variables, (iv) headers, (v) request parameters, (vi) a request body structure and (vii) a response body structure identified from built-in annotations in a code of the corresponding resource class, and (viii) sequence of call, (ix) method of authentication and (x) special field constraints identified from ApiInfo annotation and AttributeInfo annotation provided by a developer in a code of corresponding resource class, wherein the extracting comprises:

scanning the plurality of identified resource classes observed for a plurality of API related annotations in the code of the identified resource classes, wherein an object parser utility of the instance of the forwarder aids in scanning the plurality of identified resource classes; and extracting the metadata from the plurality of API related annotations;

forward the extracted metadata to a test engine server to store in a database; and collect the extracted metadata from the database, by the test engine server to generate a plurality of test cases as a plurality of web service objects, the plurality of webservice objects acting as request payloads to the plurality of web service APIs in the resource classes, wherein each of the plurality of test cases are generated by the test engine server as an HTTP request comprising the path variables, the request parameters, the request body, a Uniform Resource Locator, URL, derived from the URL, the authentication method, the headers and the HTTP method based on the extracted metadata, wherein the test cases are generated for the web service APIs according to the sequence of call, and the request fields are filled based on the special field constraints.

5. The system of claim 4, wherein the ApiInfo annotation and the AttributeInfo annotation are additional annotations made available for a developer to refine the test cases.

6. The system of claim 5, wherein the ApiInfo annotation comprises sequence attribute which indicates sequence of call of the web service APIs, various a plurality of authentication related attributes and wherein the AttributeInfo annotation comprises a plurality of attributes which facilitate creation of the test cases.

7. One or more non-transitory machine-readable information storage mediums comprising one or more instructions, which when executed by one or more hardware processors causes:

receiving, by the one or more hardware processors, a web application comprising a plurality of web service APIs;

identifying, by the one or more hardware processors, a plurality of resource classes corresponding to each of the plurality of web service APIs by an instance of a forwarder using API related annotations present in a code of a package specified in the instance of the forwarder, wherein the forwarder is a library integrated with the web application, and wherein the API related annotations indicate that a class following an annotation is a resource class;

extracting, by the one or more hardware processors, metadata related to each of the plurality of web service APIs from the plurality of resource classes by the instance of the forwarder using reflection libraries, wherein the extracted metadata for each of the plurality of web service APIs comprises at least one of (i) a Uniform Resource Identifier (URI), (ii) an HTTP Method, (iii) path variables, (iv) headers, (v) request parameters, (vi) a request body structure and (vii) a response body structure identified from built-in annotations in a code of the corresponding resource class, (viii) sequence of call, (ix) method of authentication and (x) special field constraints identified from ApiInfo annotation and AttributeInfo annotation provided by a developer in a code of corresponding resource class, wherein the extracting comprises:

scanning, by the one or more hardware processors, the plurality of identified resource classes observed for a plurality of API related annotations in the code of the identified resource classes, and scanning the plurality of identified resource classes by an object parser utility of the instance of the forwarder; and extracting the metadata from the plurality of API related annotations;

forwarding, by the one or more hardware processors, the extracted metadata to a test engine server to store in a database; and collecting, by the test engine server, the extracted metadata from the database and generate a plurality of test cases as a plurality of web service objects, the plurality of web service objects acting as request payloads to the plurality of web service APIs in the resource classes, wherein each of the plurality of test cases are generated by the test engine server as an HTTP request comprising the path variables, the request parameters, the request body, a Uniform Resource Locator, URL, derived from the URL, the authentication method, the headers and the HTTP method based on the extracted metadata, wherein the test cases are generated for the web service APIs according to the sequence of call, and the request fields are filled based on the special field constraints.

* * * * *